March 17, 1936.　　　　I. JEPPSSON　　　　2,033,939
PORTABLE ELECTRIC CUTTING MACHINE
Filed July 24, 1933　　　　4 Sheets-Sheet 1
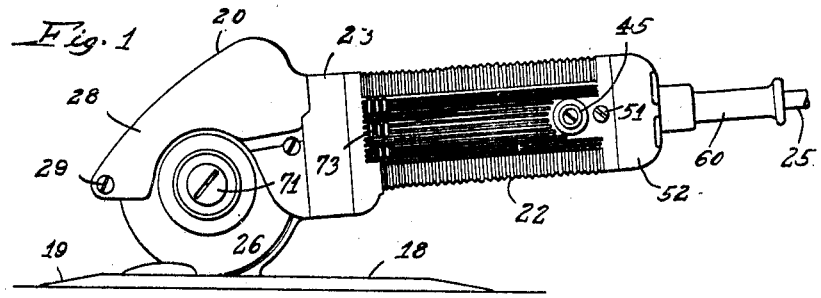
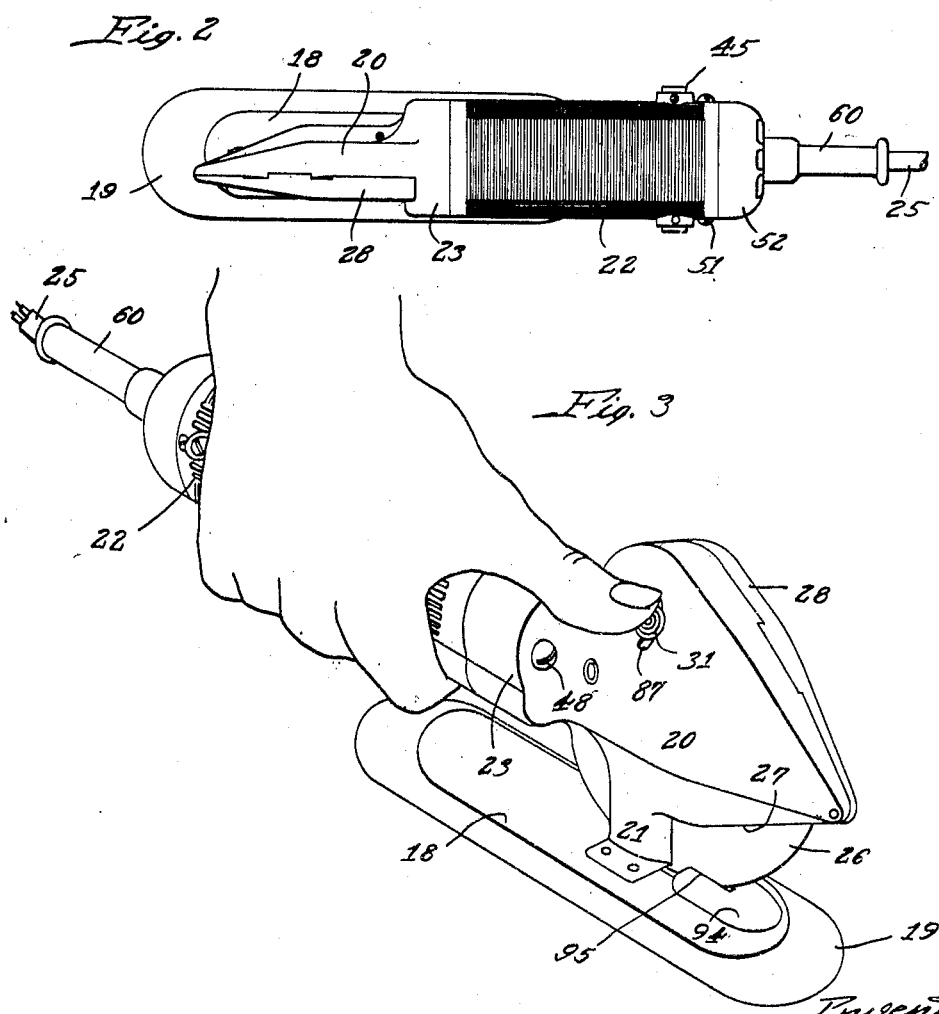

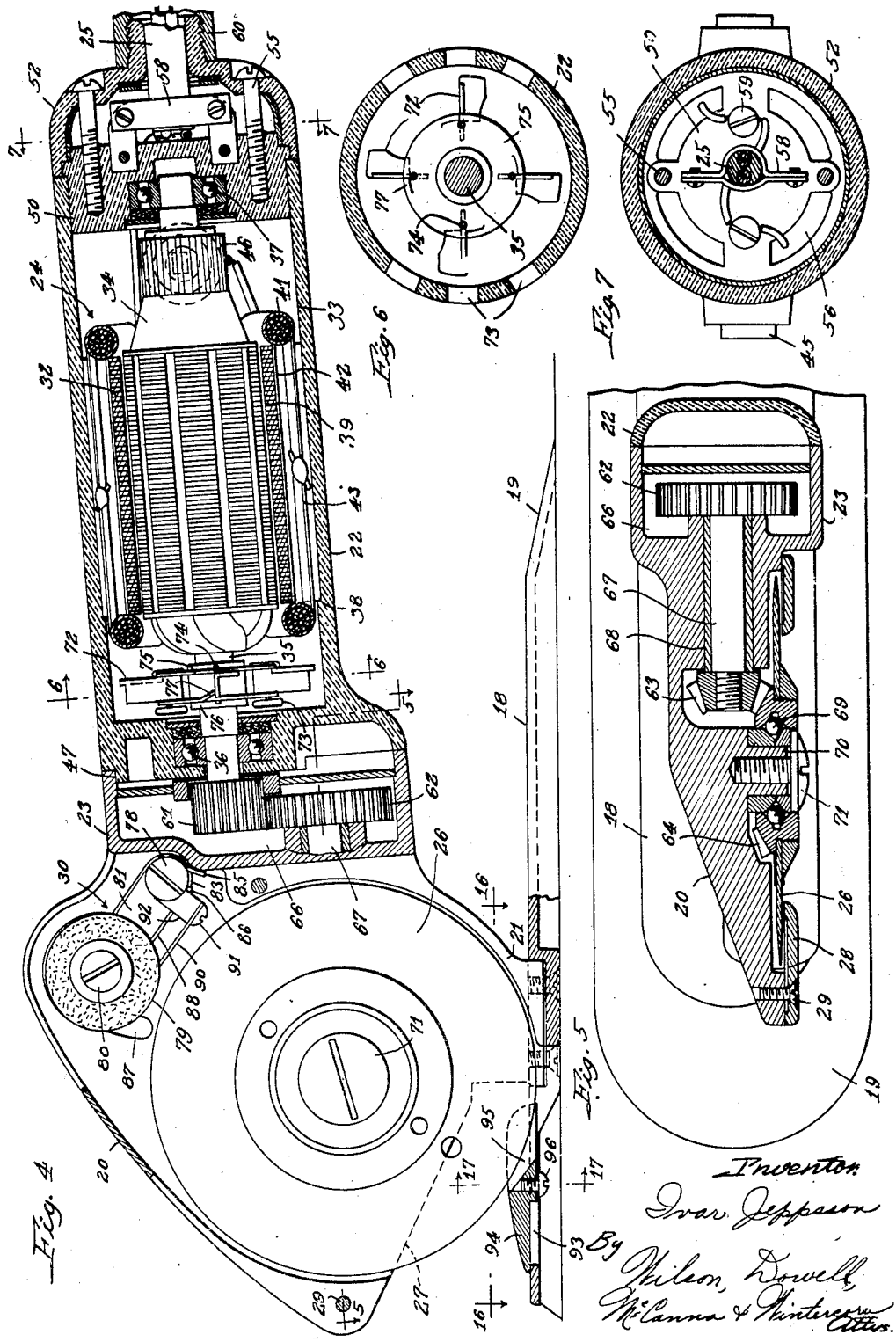

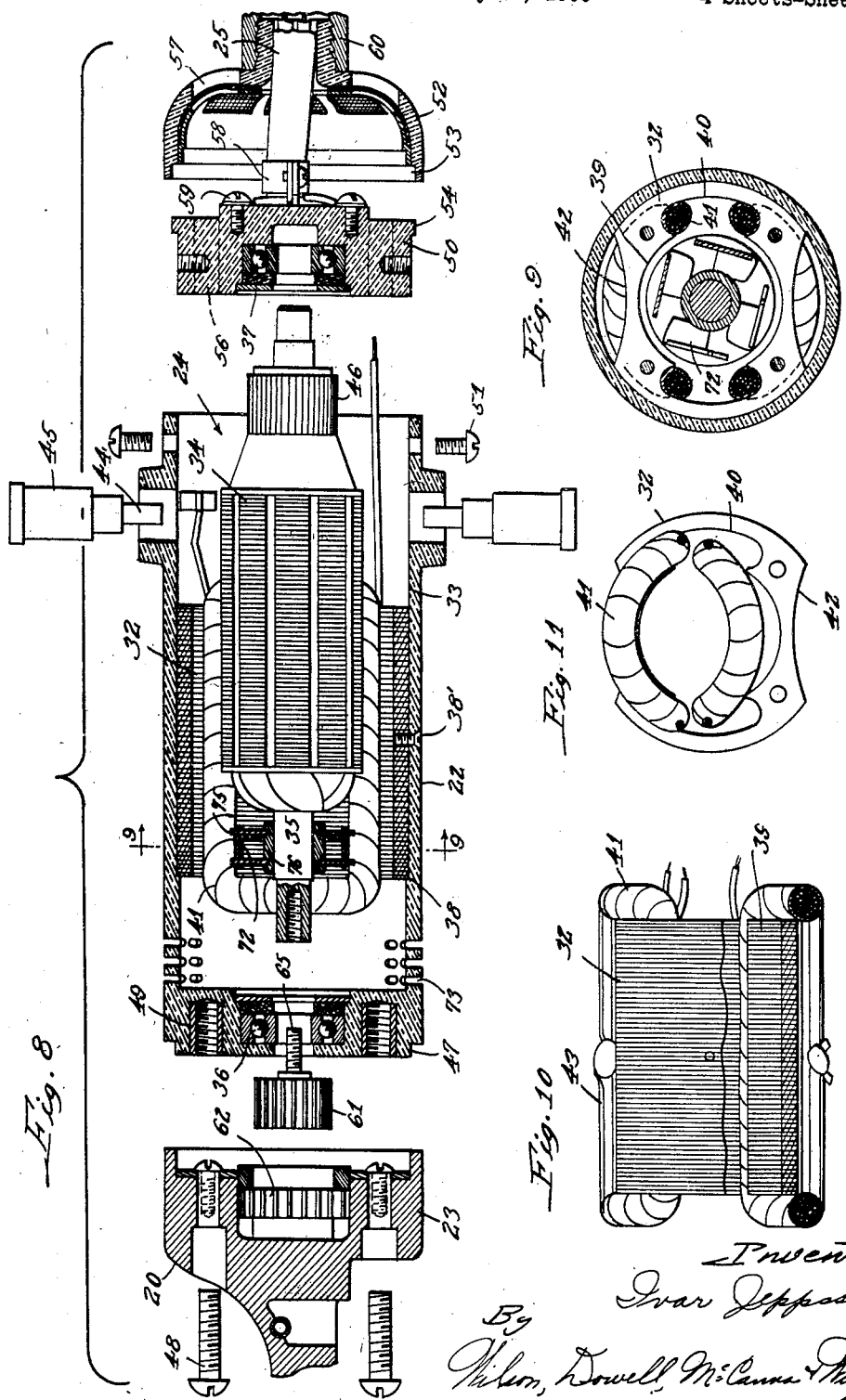

March 17, 1936.  I. JEPPSSON  2,033,939
PORTABLE ELECTRIC CUTTING MACHINE
Filed July 24, 1933   4 Sheets-Sheet 4
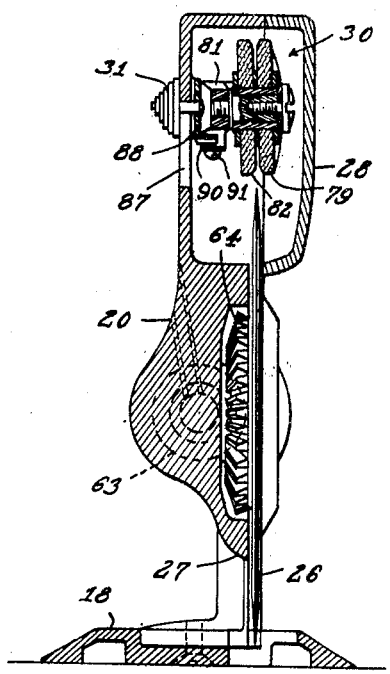
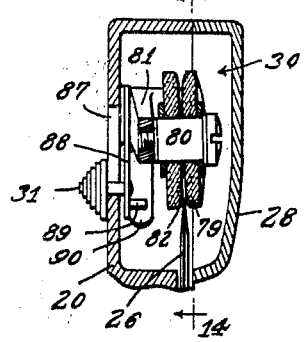
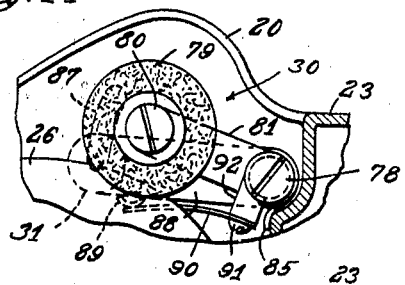
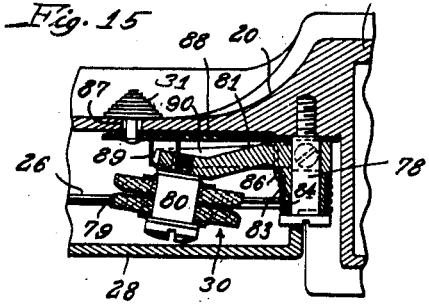
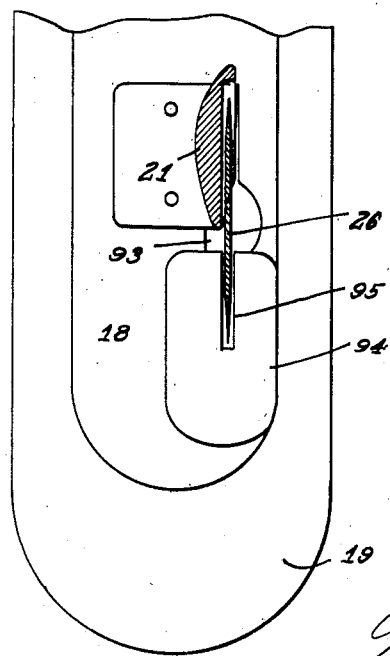
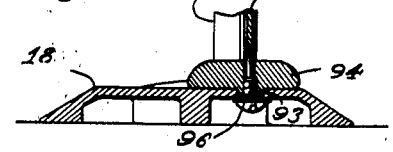
Inventor
Ivar Jeppsson
By
Wilson, Bowell, McCanna & Pinterom
Attys.

Patented Mar. 17, 1936

2,033,939

UNITED STATES PATENT OFFICE 2,033,939

PORTABLE ELECTRIC CUTTING MACHINE

Ivar Jeppsson, Chicago, Ill., assignor to Chicago Flexible Shaft Company, Chicago, Ill., a corporation of Illinois Application July 24, 1933, Serial No. 681,841

22 Claims. (Cl. 164—76)

This invention relates to a portable electric cutting machine or shear especially designed and adapted for cloth cutting but, of course, suitable for cutting any similar kind of material.

The principal object of my invention is to provide a rotary type shear which is lighter and handier to manipulate than other machines made for a similar purpose. In carrying out this object, the present machine has been designed so that the motor casing projects horizontally from the back of the cutter housing and is shaped and proportioned to serve as the handle for manipulating the machine, thus dispensing with a separate handle otherwise required, and resulting in a machine that is not only easier to handle but approaches the work in such a way that greater speed and accuracy in cutting is obtained.

Other important objects and advantages of the invention may be enumerated as follows:

(1) The provision of a completely enclosed grinder mounted in the cutter housing in such a position that its actuating knob may be worked by thumb pressure without the operator releasing his grip on the handle, thus making for handiness and safety in operation.

(2) The provision of a grinder comprising a grinding wheel that is resiliently actuated so as to prevent excessive pressure of the wheel on the rotary cutter, and secure a better sharpening action by reason of the delicate application of the grinder.

(3) The provision of a handle serving as the motor casing but constructed of insulating material so that there is no danger of shocks being transmitted through the handle to the operator.

(4) The provision of a handle to serve as a motor casing made up of three parts, namely, the hollow body open at only one end to permit assembling the motor therein, a bearing support to close the open end and receive the end of the armature, and an end cover to enclose the bearing support, besides serving for attachment of the extension cord protector.

(5) The provision of fan blades on the armature shaft inside the handle swingable inwardly to an out of the way position to clear the stator of the motor in the assembling of the armature, thus making possible the use of a fan of a large working diameter and yet permit insertion or removal of the armature without disturbing the stator which is pressed in place in the handle.

These and other objects of the invention will be brought out in the course of the following detailed description, in which reference is made to the accompanying drawings, wherein—

Figs. 1 and 2 are a side and plan view, respectively, of a machine made in accordance with my invention;

Fig. 3 is a perspective view looking at the other side of the machine and indicating how the same is adapted to be held and how the grinder may be operated by thumb pressure;

Fig. 4 is a longitudinal section through the machine in a vertical plane;

Fig. 5 is a horizontal section on the line 5—5 of Fig. 4;

Figs. 6 and 7 are cross-sections on the correspondingly numbered lines of Fig. 4;

Fig. 8 is a longitudinal section through the handle and rear portion of the head in a horizontal plane showing the parts in dissembled relationship but more or less indicating the manner and order of assembly;

Fig. 9 is a cross-section on the line 9—9 of Fig. 8 showing how the fan blades are retracted in the assembling operation to clear the pole faces of the stator;

Fig. 10 is a view partly in section and partly in elevation of the stator with the field windings assembled thereon preparatory to entering the stator in the handle with a press fit;

Fig. 11 is an end view of Fig. 10 showing how the field windings are entered in the stator;

Fig. 12 is a vertical cross-section through the head end of the machine showing the grinder in cross-section and in retracted relation to the cutter;

Fig. 13 is a sectional detail showing the grinder in engagement with the cutter;

Fig. 14 is a view taken on the line 14—14 of Fig. 13 showing the grinder in side elevation;

Fig. 15 is a horizontal section through the grinder, and

Figs. 16 and 17 are sections on the correspondingly numbered lines of Fig. 4.

The same reference numerals are applied to corresponding parts throughout the views.

Referring mainly to Figs. 1-5, the numeral 18 is applied to the flat elongated base which supports the machine slidably on the table where the cloth or other material is being cut, the base having slanting front and rear ends as indicated at 19 and also inclined sides so as to slide easily under the material and not right over. For similar reasons the ends are rounded as shown and so as not to have any sharp corners that might get caught on the material. The base has the head 20 supported thereon by means of a standard 21 suitably secured, as by screws, to the base. The standard 21 is made as narrow as possible in parallelism with the plane of the cutter so as not to offer any serious obstruction to the feeding of the material past the cutter—see Fig. 16. The handle 22, which projects rearwardly and at a slight angle of inclination with respect to the horizontal, is fixed to the head 20 on the hollow enlarged rear portion 23 thereof. The handle 22 contains an electric motor 24 to which current is supplied through an extension cord 25 extended from the rear end of the handle. The head 20 extends vertically from the base 18 and constitutes a housing for the rotary circular knife or cutter disc 26. The latter, as will soon appear, is driven by the motor 24 and is exposed to the extent of about one-sixth of its periphery at the cut-away lower front portion 27 of the head, as clearly appears in Figs. 3 and 4, whereby to cut the material in the forward movement of the machine. A cover plate 28 is fastened on the head 20 as by means of screws 29 to enclose the greater portion of the upper half of one side of the disc so that the disc is practically completely guarded except for the portion that is necessarily exposed for cutting. The head 20 with its plate 28 also serves as a housing for a grinder 30 disposed over the cutter 26 and arranged to be actuated by means of a knob 31 projecting from the right side of the head where it may be reached by the thumb when the operator is grasping the handle, as shown in Fig. 3. This makes for handiness in sharpening and protection of the operator from flying particles of emery and from the sparks thrown off in sharpening, besides affording a guard for the grinder as a matter of safety. A machine of this general design, having the head devoid of anything above the cutter outside of the small grinder and with the handle extended rearwardly therefrom substantially horizontally, makes for much easier and handier operation. The operator has an unobstructed view of the work as the cutter is made to approach and can do more work than would be possible otherwise and with greater accuracy, all awkwardness in the manipulation of the machine being eliminated by virtue of the design. It goes without saying also that the fact that the motor is embodied in the handle, thus making the handle serve as a motor casing and making the provision of a separate handle unnecessary, results in a machine of less weight. Furthermore, with this arrangement the construction is generally simplified and made more compact and economical. The extent to which the weight of the machine has been cut down in accordance with my design can best be appreciated from the statement that the present machine has a cutting capacity about equal to certain machines at present available which are at least ten times as heavy.

The motor 24 comprises a laminated stator 32, having a press fit in the bore 33 of the handle 22, and an armature 34, the shaft 35 of which is received in anti-friction bearings 36 and 37 in the handle. The exact location of the stator is predetermined by the annular shoulder at 38 where there is a slight reduction in the bore 33, the stator being pressed in to a point where it has abutment with the shoulder, and being suitably secured by one or more screws 38' entered through the wall of the handle and threaded in the stator. The stator provides opposed pole faces 39 with relation to which the armature 34 rotates, with a predetermined air gap left therebetween. Internal recesses 40 are formed in the stator to accommodate the field windings 41. External recesses 42 are provided in the stator to permit ties 43 to be extended lengthwise across the outside of the stator to hold the windings in place. Brushes 44 are mounted in holders 45 in the diametrically opposite sides of the handle for cooperation with the commutator 46 and, of course, these brushes have connection with the windings 41 and the wires in the extension cord 25 to secure operation of the motor when a switch (not shown) for completing the circuit through the motor is closed. The switch may be on the cord 25 or at some convenient place on the handle or other part of the machine as desired. It has, of course, been necessary to design the motor 24 so that its overall diameter will conform to what is proper for a handle diameter, so that the handle, as a motor casing, will not be awkward to grasp for the manipulation of the machine. The main hollow body portion of the handle 22 is open only at one end as shown so as to permit assembling the motor in the handle through that end. There is a slight reduction in the external diameter of the handle at the closed end, as shown at 47, so as to fit in the rear portion 23 of the head 20 for the fastening of the handle to the head by screws 48 entered through the portion 23 of the head and threaded in bushings 49 inserted in the handle 22 in the molding thereof, the handle being of bakelite or any other suitable insulating material. The bearing 36 is mounted in the closed end of the handle. A plug 50 serves as a closure for the open end of the handle and supports the bearing 37. Screws 51 entered through the wall of the handle and threaded in the plug serve to hold the latter in place. A cover 52 is counterbored as at 53 to fit over the rim 54 of the plug 50, and screws 55 are entered through the cover 52 and threaded in the plug 50 to hold the cover in place, flush with the end of the handle 22. The plug 50 has openings 56 therein which like the screened openings 57 in the cover 52 serve to allow the intake of air past the motor armature and out of the front end of the handle, as will soon appear. A clamp 58 secures the end of the extension cord 25 to the plug 50 and the wires from the cord are extended to binding posts 59 on the plug for connection with other wires leading to the field windings 41 and brushes 44 through the air holes 56, as indicated in Fig. 7. A flexible cord protector 60 is mounted on the back of the cover 52 and has the extension cord 25 extended therethrough, as shown. The fact that the handle, while serving as the motor casing, is made of insulating material means protection against the possibility of electrical shocks should some electrical trouble develop, and it will soon appear how the handle is cooled by a forced draft of air therethrough to prevent overheating of the handle when the machine is kept in continuous operation for long periods of time. The three-piece construction of the handle, using the main body portion open at only one end, together with the bearing support constituting a closure for the open end and the cover for the latter, makes possible the elimination of through bolts otherwise required, and in that way the overall diameter is kept down to a point consistent with the use of the motor casing as a handle. Furthermore, such construction means increased strength and rigidity and gets away from the need for too many unsightly joints. I contemplate the use of a motorized handle of this type in connection with various kinds of devices that are motor driven, such, for example, as clippers or shears, electric drills, grinding wheels, food and drink mixers, etc., the handle being easily attached to different devices properly designed to carry the same. In that way the manufacturer of electrical devices is not put to the necessity of making a different size and shape of motor-containing handle for each of a series of different devices, but can use one handle for a number of devices.

The motor 24 drives the cutter 26 through a two-step gear reduction 61—62 and 63—64. 61 is a pinion having a threaded shank 65 screwed into the front end of the armature shaft 35, as indicated in Fig. 8. The shaft 35 projects through the bearing 36 into a lubricant chamber 66 provided in the rear portion 23 of the head 20, wherein the pinion 61 meshes with the gear 62. The latter is carried on the rear end of a short shaft 67 received in a bearing 68 provided in the head 20. On the forward end of this shaft is the bevel pinion 63 which meshes with the bevel gear 64 mounted on the cutter 26. The gear 64 turns on an anti-friction bearing 69 provided on a central hub 70 on the head 20, a large flat-headed screw 71 serving to hold the bearing parts in place and retain the cutter 26 in its operative position. It is obvious that the construction affords a substantially direct drive between the motor and cutter, and the drive is such that the machine operates smoothly and quietly. One of the gears 61—62 is preferably of fiber or other sound deadening material to make for greater smoothness and quietness in operation, besides offering insulation between the handle and head to prevent the transmission of electric shocks in the event of any electrical trouble developing in the motor.

The air cooling of the handle is secured by the revolution of fan blades 72 with the armature shaft 35, forcing air out through the radial holes 73 provided in the diametrically opposite sides of the handle and at the same time causing air to be taken in through the holes 56 and 57 and passed lengthwise through the motor 24 to the fan blades. The screen on the inside of the cover 52 covering the air holes 57 is, of course, for protection of the motor against dust and lint. The fan blades 72 normally occupy extended positions for a fairly large working diameter, as indicated in Figs. 4 and 6, but are pivotally mounted on the armature shaft 35 so as to be capable of spring movement inwardly to a retracted position, as indicated in Figs. 8 and 9, all within the small diameter of the pole faces 39 of the stator 32, whereby to permit assembling or removing the armature without disturbing the stator and yet have a fan of large working diameter. The pivots for the blades 72 are indicated at 74, the same being trunnions received in a pair of parallel side plates 75 carried on a hub 76. As best indicated in Fig. 4, the side plates 75 have shoulders 77 provided thereon which come into abutment with the back of the blades when the blades swing out to a radial operative position under centrifugal force in the turning of the armature. Viewing Fig. 6, the blades swing in a counter-clockwise direction toward operative position and engagement with the shoulders 77, and in a clockwise direction toward retracted inoperative position.

The grinder 30 illustrated in Figs. 11-15 and also appearing in Fig. 4 is carried on a stud 78 in the upper rear portion of the head 20 so as to be completely enclosed for protection of the operator from flying particles of emery as well as from sparks, and also as a matter of safety in the event of breakage of one of the emery discs of the grinder. The grinder consists of a wheel 79 made up of two discs of emery mounted in spaced relation on a stud 80 projecting laterally from the outer end of an arm 81 pivotally mounted on the stud 78. The arm carries the grinder wheel in a substantially vertical plane but canted at an acute angle with respect to the plane of the cutter 26, as indicated in Fig. 15. The opposed faces of the discs forming the wheel are beveled as at 82 to assure entry of the cutting edge therebetween when the grinder is moved to operative position—see Fig. 13. The angle at which the grinder wheel is canted with respect to the cutter always insures simultaneous engagement of the discs with the opposite faces of the cutting edge regardless of wear of the discs and causes both of the discs to give the same grinding action with the result that the cutter is given a keen cutting edge. The arm 81 is normally urged upwardly to retracted position and held in such position by a coiled torsion spring 83, which encircles the hub 84 of the lever and has one end 85 bearing against an adjacent portion of the housing and another end 86 engaging the underside of the arm 81, tending normally to move the arm in a clockwise direction as viewed in Figs. 4 and 14. The knob 31 for actuating the grinder by thumb pressure has its shank projecting through a slot 87 in the wall of the head 20 for mounting of the knob on a lever 88 disposed inside the head and pivoted on the stud 78. A lug 89 projecting from the lever 88 engages the outer end of a leaf spring 90 fastened as by means of a screw 91 onto a boss 92 projecting downwardly from the hub of the lever 81. The knob 31 is normally disposed at the upper end of the slot 87, preventing the grinder from coming in contact with the top wall of the head, as shown in Fig. 12. However, when the cutter 26 is to be sharpened, the knob 31 is depressed by the thumb as shown in Fig. 3 to move the grinder toward the cutter through the medium of the leaf spring 90. In other words, the grinder is not moved positively but only through a resilient member, the give in which assures softer and more delicate application of the grinder and prevents sudden and excessive pressure of the grinder upon the cutter. As indicated in Fig. 14, the spring 90 will flex when the grinder comes into contact with the cutter and the knob 31 is moved farther to apply some pressure on the grinder. The grinder is therefore free to move away from the cutter but only against the action of the spring 90; the grinder is not positively held in contact with the cutter. This is a safety feature and prevents breakage of the grinder and also prevents damage to the cutter. Just as soon as the operator releases his thumb pressure on the knob 31 the spring 83 returns the grinder to retracted position. The location of the grinder is of particular importance because it allows the operator to actuate the grinder with his thumb without releasing his hold on the handle. The operation is simple and direct, and the construction is free of complications such as intermediate links and levers, the grinder being made up of an unusually small number of parts.

In conclusion, it will be observed that the base 18 is slotted longitudinally, as indicated at 93; to accommodate the lower portion of the cutter 26. The front end of this slot is narrow and receives a projecting key portion of a throat plate 94, the top of which is inclined as appears in Fig. 4 so as to guide the material at the proper angle to the cutter. A slot 95 is formed in the rear portion of the plate for the operation therein of the cutter. A screw 96 threaded in the plate serves by abutment with the underside of the base 18 alongside the slot 93 to clamp the plate in its position of fore and aft adjustment.

It is believed the foregoing description conveys a good understanding of all of the objects and advantages of my invention. The appended claims have been drawn with a view to covering all legitimate modifications and adaptations.

I claim:

1. In combination with a rotary circular knife, a sharpener comprising a rotary grinder movably mounted adjacent the cutting edge of the knife for movement toward and away from engagement with said knife, said grinder being constructed and arranged so as to engage both sides of the cutting edge of the knife simultaneously, the grinder tending normally to move away from the knife, a spring member for moving said grinder yieldably toward the knife, and manually operable means for actuating said spring member, whereby to move the grinder to the knife and press the grinder resiliently against the knife.

2. In combination with a rotary circular cutter blade, a sharpener comprising a rotary grinder wheel canted with respect to the plane of the blade and constructed so as to have engagement with both sides of the blade's cutting edge simultaneously, said wheel being movably mounted for movement toward and away from the blade and tending normally to move away from the blade, a spring member for communicating movement to said grinder wheel toward the blade, and manually operable means for actuating said spring member, whereby to move the wheel to the blade and press the wheel yieldingly against the blade.

3. In combination with a rotary circular knife, a sharpener comprising a rotary grinder movably mounted adjacent the cutting edge of the knife for movement toward and away from engagement with said knife, the grinder tending normally to move away from the knife, a spring member for moving said grinder yieldably toward the knife, and manually operable means for actuating said spring member, whereby to move the grinder to the knife and press the grinder resiliently against the knife.

4. In combination with a rotary circular cutter blade, a sharpener comprising a rotary grinder wheel canted with respect to the plane of the blade, said wheel being movably mounted for movement toward and away from the blade and tending normally to move away from the blade, a spring member for communicating movement to said grinder wheel toward the blade, and manually operable means for actuating said spring member, whereby to move the wheel to the blade and press the wheel yieldingly against the blade.

5. In combination, a rotary cutter, a grinder therefor, manual means operable positively for moving the grinder into engagement with the cutter, and spring means interposed between the grinder and manual means and arranged so as to be placed under stress in proportion to the operating pressure imposed upon the manual means, whereby to yieldably press the grinder against the cutter under variable pressure.

6. In combination with a rotary cutting blade, a grinder wheel rotatably mounted on the end of an arm swingable toward and away from the blade, whereby to move the wheel into and out of grinding engagement with the blade, spring means normally tending to swing said arm away from the blade, a leaf spring rigid at one end with said arm, and manually operable means for communicating swinging movement to said arm toward the blade through the medium of said leaf spring, whereby said wheel may be pressed yieldingly against the blade by positive manual movement of said last mentioned means.

7. In combination with a rotary cutting blade, a grinder wheel rotatably mounted on the end of an arm swingable toward and away from the blade, whereby to move the wheel into and out of grinding engagement with the blade, another arm swingable alongside the first arm, the second arm being movable manually in a certain direction for communicating movement to the first arm toward the blade, said first arm tending normally to move away from the blade to retracted position, and spring means providing a resilient operating connection between said arms, said spring means being subject to stress in the manual movement of the second arm and serving to yieldingly urge the grinder wheel toward engagement with the blade, and said spring means serving upon release of said second arm to return the same to a normal retracted position.

8. In an electric cutting machine of the character described, the combination of a base having a blade housing supported thereon, a power operable rotary cutting blade enclosed in said housing, a hollow handle projecting rearwardly from the housing, small enough to allow encircling by the fingers of one hand of the operator in operating and moving said machine, the handle being also large enough to accommodate a motor therein, an electric motor in said handle operatively connected with said cutting blade to rotate the latter, a grinder disposed adjacent the blade in said housing, whereby the housing serves as a protective enclosure for the grinder and blade, and a member for moving the grinder relative to the blade, said member projecting from the housing and being so constructed and related to the front end of the handle as to be movable readily by thumb pressure.

9. In a cutting machine of the character described, the combination of a base having a blade housing supported thereon, a power operable rotary cutting blade enclosed in said housing, a handle projecting rearwardly from the housing and adapted to be grasped in one hand by the operator in operating and moving said machine, a grinder disposed adjacent the blade in said housing, whereby the housing serves as a protective enclosure for the grinder and blade, and a member projecting from the housing in a predetermined relation to the front end of the handle for movement by finger pressure to move the grinder in the housing relative to the blade.

10. In a cutting machine of the class described, a base plate, a rotary cutter disc disposed in a substantially vertical plane relative to said plate, a support therefor projecting from the base and constructed of electrical conducting material, a hollow handle of nonconducting material extending from said support and constructed to serve as a motor casing, an electric motor in said handle including an armature shaft extending toward said support, and gearing providing a driving connection between the armature shaft and the aforesaid disc, said gearing including at least one gear of non-conducting material for further insulating the handle from the support.

11. In a motor driven device of the class described, the combination of a hollow handle adapted to contain a motor, a motor armature supported in bearings in said handle and having the shaft thereof projecting from one end of said handle for drive purposes, a stator for said armature mounted in said handle and having pole faces on a predetermined radius with respect to the armature, said handle being open at one end to admit the armature and permit assembling the stator in the handle, said handle having openings provided in the wall thereof between the closed end and the stator, fan blades pivotally mounted on the armature shaft so as to revolve relative to said openings to cause air to flow therethrough in one direction relative to the handle, said blades being movable from extended operative positions inwardly to retracted positions so as to permit entry or removal thereof with the armature between the pole faces of the stator without disturbing the stator, and closure means for the open end of said handle, the latter end of said handle having provision for the travel of air through the handle in one direction relative to the aforesaid openings and fan for passage lengthwise through the motor for cooling purposes.

12. In a motor driven device of the class described, the combination of a hollow handle adapted to contain a motor, a motor armature supported in bearings in said handle and having the shaft thereof projecting from one end of said handle for drive purposes, a stator for said armature mounted in said handle and having pole faces on a predetermined radius with respect to the armature, said handle being open at one end to admit the armature and permit assembling the stator in the handle, one of the bearings for said armature being provided directly in the closed end of said handle, and a closure for the open end of said handle having the other armature shaft bearing therein.

13. In a motor driven device of the class described, the combination of a hollow handle adapted to contain a motor, a motor armature supported in bearings in said handle and having the shaft thereof projecting from one end of said handle for drive purposes, a stator for said armature mounted in said handle and having pole faces on a predetermined radius with respect to the armature, said handle being open at one end to admit the armature and permit assembling the stator in the handle, one of the bearings for said armature being provided directly in the closed end of said handle, a closure for the open end of said handle having the other armature shaft bearing therein, and a cover for said closure having an extension cord extended therethrough and secured to said closure, whereby to provide electrical connections with the motor.

14. In a motor driven device, the combination of a hollow handle adapted to contain a motor, a motor armature and stator mounted in said handle, a device carried on the handle and operatively connected with said armature to be driven thereby, the armature being removable, and fan blades pivotally mounted on the armature shaft and movable from a retracted position to extended operative position, the blades when retracted permitting easy removal and replacement of the armature but being arranged when extended to be revolved relative to air openings provided in the handle, whereby to cause air flow through the handle.

15. In a machine of the class described, a base plate, a rotary cutter disposed in a substantially vertical plane relative to said plate and having a drive gear fixed to the center thereof and turning therewith, a support therefor projecting from the base, and a hollow handle extending substantially horizontally rearwardly from said support and containing a motor having a right angle driving connection with the gear on said cutter.

16. In a machine of the class described, a base plate, a rotary cutter disposed in a substantially vertical plane relative to said plate and having a drive gear fixed to the center thereof and turning therewith, a support therefor projecting from the base and having a substantially cylindrical handle detachably secured on the cylindrical rear portion of said support so as to extend substantially horizontally rearwardly therefrom, and a motor housed in said handle and having a detachable driving connection substantially at right angles with the gear on said cutter.

17. In a machine of the class described, a base plate, a rotary cutter disposed in a substantially vertical plane relative to said plate and having a drive gear fixed to the center thereof and turning therewith, a support therefor projecting from the base and constructed of electrical conducting material, and a hollow handle of non-conducting material extending rearwardly from said support and containing an electric motor having a right angle driving connection with the gear on said cutter.

18. An electrically driven cutting machine comprising a rotating cutter having a drive gear fixed to the center thereof and turning therewith, a slidable support therefor, a handle on said support for moving the same relative to work to be cut, and an electric motor for driving the cutter operatively connected at right angles with the gear on said cutter and supported on said support coaxial with the handle.

19. An electrically driven cutting machine comprising a rotating cutter having a drive gear fixed to the center thereof and turning therewith, a slidable support therefor, a handle on said support for moving the same relative to work to be cut, and an electric motor for driving the cutter disposed in said handle for support and operatively connected at right angles with the gear on said cutter.

20. An electrically driven cutting machine comprising a rotating cutter having a drive gear fixed to the center thereof and turning therewith, a slidable support therefor, a handle on said support for moving the same relative to work to be cut, an electric motor for driving the cutter disposed in said handle for support and operatively connected with said cutter, and an extension cord for supplying electric current to said motor extending from the free end of the handle.

21. In a cutting machine of the class described, a base plate adapted to be moved along a suitable support, a rotary cutter disc disposed in a substantially vertical plane relative to said plate, a support projecting from the base to approximately the same height as the disc and having said disc mounted thereon and partially enclosed therein, a hollow handle carried on said support and projecting substantially horizontally rearwardly therefrom with the top thereof in approximately the same plane with the top of the support, and a motor housed in said handle and driving said disc.

22. In a motor driven device, the combination of a hollow handle adapted to contain an electric motor, a motor armature and stator mounted in said handle, a device attached to the handle and operatively connected with said armature to be driven thereby, the stator being fixed in the handle and the armature being removable endwise through one end of the handle, fan blades within the handle mounted on the armature shaft at one end of the stator and extending when in operative working position radially beyond the pole faces of the stator, the handle having air openings adjacent to the fan blades whereby to cause air flow through the handle by rotation of the armature, the fan blades being mounted so as to be retractable to an inner position in which to clear said pole faces when removing and replacing the armature endwise in the handle.

IVAR JEPPSSON.

CERTIFICATE OF CORRECTION.

Patent No. 2,033,939.

March 17, 1936.

IVAR JEPPSSON.

It is hereby certified that error appears in the printed specification of the above numbered patent requiring correction as follows: Page 5, second column, line 56, claim 20, after "connected" insert the words at right angles; and same line, after "with" insert the words the gear on; and that the said Letters Patent should be read with these corrections therein that the same may conform to the record of the case in the Patent Office.

Signed and sealed this 21st day of April, A. D. 1936.

Leslie Frazer (Seal)

Acting Commissioner of Patents.